United States Patent Office

3,554,768
Patented Jan. 12, 1971

---

3,554,768
CARBOHYDRATE FIXED ACETALDEHYDE
Jacob R. Feldman, New City, N.Y., assignor to General Foods Corporation, White Plains, N.Y., a corporation of Delaware
No Drawing. Filed Aug. 1, 1967, Ser. No. 657,531
Int. Cl. A23l 1/22
U.S. Cl. 99—140                                                14 Claims

---

ABSTRACT OF THE DISCLOSURE

A carbohydrate substance and acetaldehyde is uniformly mixed in water and the resulting mixture is dried to form a flavor enhancing composition. This composition is useful for adding freshness to rehydratable dried fruit and vegetable foodstuffs. The shelf storageability of the flavor enhancing composition or the dry food containing it may be extended indefinitely by packaging it in a hermetically sealed container.

---

BACKGROUND OF THE INVENTION

This invention relates to the fixation of volatile food flavoring materials and more particularly to the fixation of acetaldehyde for use in the dried powdered form.

Fruits and vegetables have a delightfully fresh flavor while they are still attached to the plant on which they grow. This freshness begins to fade from the fruit or vegetable within a few hours after it is picked. Scientific investigations have revealed that this decrease in freshness is due to the loss of certain volatile chemical compounds from the fruit or vegetable. It has been discovered that one of these volatile compounds is acetaldehyde, and that its loss has a major impact on the freshness character of fruits and vegetables.

Recently it has been discovered that the freshness factor of fruit and vegetable foods, such as fruit juices, can be enhanced by the addition of acetaldehyde to them. This can easily be accomplished in canned liquid foods by pouring the acetaldehyde into the can just prior to sealing. However, where the food is a dry powdered mix the acetaldehyde must be more permanently bound so that it will not evaporate from the powdered composition.

Many attempts have been made to fix acetaldehyde in dry compositions so that they can be added to powdered foodstuffs, but it has not heretofore been possible to successfully fix acetaldehyde in a dry composition in an amount high enough to be useful commercially. Kremers in 1942, patented a process for preparing a composition which will when dissolved in acidic water, release acetaldehyde (U.S. Pat. 2,305,620). In the product prepared in the Kremers process acetaldehyde is chemically combined with urea. This is disadvantageous because when this compound is used to enhance the flavor of foodstuffs not only is acetaldehyde released, but so too is urea. The presence of large amounts of urea in food products can cause off-flavors in the product.

The physical deposition of flavors on carrier materials is well known in the art. For example, Schultz discloses, in a patent obtained by him (U.S. Pat. 2,856,291), a method of incorporating a volatile flavoring substance with sugars. He accomplishes this by preparing an emulsion of the sugar and water and blending into the emulsion the flavoring material. Among the flavoring materials which he can use are flavor oils, such as orange oil and lemon oil, and synthetic agents such as aldehydes, alcohols, esters, etc. Among the aldehydes that he lists are decanal (boiling point 231° C.) and cinnamic aldehyde (boiling point 251° C.). All of the aldehydes contemplated by Schultz have high boiling points and are stable at room temperature. Acetaldehyde, on the other hand, has a much lower boiling point than the above aldehydes, in fact acetaldehyde boils at room temperature (21° C.). One would not expect that acetaldehyde could be combined with a carbohydrate substance to form a composition having shelf stability.

SUMMARY OF THE INVENTION

It has now been discovered that a composition can be prepared containing acetaldehyde and a carbohydrate which is relatively stable at room temperature and which will release the acetaldehyde quickly upon being dissolved in water.

Accordingly, it is the object of the invention to present a process for preparing a dry, stable flavor enhancing composition containing acetaldehyde. It is another object of this invention to present a flavor enhancing composition containing a useful amount of acetaldehyde. It is a further object of the invention to present a method of preparing a dry powdered acetaldehyde-containing foodstuff which can be reconstituted in water to give a product possessing the full flavor of the freshly prepared foodstuff. These and other objects of the present invention will become obvious from the description and examples.

According to the invention acetaldehyde is fixed in a carbohydrate substance of the character described by preparing an aqueous solution or dispersion of the carbohydrate in water, uniformly blending into the carbohydrate solution or dispersion acetaldehyde and drying the resulting mixture. The carbohydrates contemplated in the present invention are hydrophilic colloids not containing free amine groups, dextrins, partially hydrolyzed starches such as corn syrup solids, and sugars.

Any of the usual methods of drying may be employed such as spray drying, freeze drying etc. The spray drying method is preferred because it is not necessary to subsequently comminute the dried product, hence there is less loss of acetaldehyde than when using drying methods that must be followed by size reduction operations.

The dry powdered flavor enhancer can be added to fruit beverages to increase the freshness factor of beverages. It can also be added to powdered fruit and vegetable products that are to be reconstituted by adding them to water. It it is intended to store the flavor enhancer composition for a long period of time, it is preferable to hermetically seal it in a moisture-proof container, as exposing dry sugar containing compositions to high humidity subjects them to water absorption and may result in a loss of acetaldehyde. The acetaldehyde-enhancer composition can be stored in a container either by itself or it can be mixed with a finished product such as a powdered fruit beverage or a powdered gelatin dessert mix.

DESCRIPTION OF THE INVENTION

In the present discussion the term "carbohydrate" includes two general classes of materials, (1) hydrophilic colloids not containing a free amine group and (2) water soluble or dispersible carbohydrates having the formula $(C_6H_{10}O_5)n$ where $n$ can vary from 1 to a value at which the carbohydrate ceases to be water dispersible. Typical hydrophilic colloids which can be used in the present invention are gum arabic, larch gum, Irish moss, carrageehan, etc. Hydrophilic colloids having free amine groups such as gelatin and pectin have been generally found to be unacceptable as fixative materials in the present invention because of the tendency of reaction between the amine groups and the carbonyl group present in acetaldehyde. This reaction, commonly known as the Maillard reaction, causes the acetaldehyde to be depleted from the composition. Included in the class of materials having the formula $(C_6H_{10}O_5)n$ are the water soluble dextrins, partially hydrolyzed starches such as corn syrup solids and sugars such as lactose, sucrose, maltose, etc. Mixtures of any of these materials may also be used as the fixative material.

Generally, the preferred fixative materials are the sugars and corn syrup solids since these are usually used in powdered food formulations as sweetening agents. However, if it is intended that the product be stored under conditions such that the powdered mix will be exposed to humid air it is preferable to use those materials which do not exhibit any great degree of hygroscopicity such as the higher molecular weight dextrins and the relatively non-hygroscopic sugars such as sucrose.

The amount of water added to the carbohydrate materials is not critical. Any amount can be used varying from the least amount necessary to effect hydration of the carbohydrate to an amount sufficient to completely disperse or dissolve the carbohydrate. For example, when using sugar melt procedures very little, if any, water is added to the sugar, and when using spray drying techniques a large excess of water is added to the sugar. The economics of the process also influences the amount of water added to the carbohydrate, for example, if the flavor enhancing composition is to be freeze dried it is necessary, from a cost standpoint to use as little water as possible because water removal in a freeze dryer is expensive and time consuming. Another reason for using as little water as necessary in the process is that the amount of acetaldehyde initially retained increases as the solids content of the mixture being dried increases.

Any method of introducing the acetaldehyde into the hydrated carbohydrate can be used. Thus, the acetaldehyde can be bubbled through the carbohydrate, as by introducing it as a gas below the surface of the carbohydrate, or it can be added as a liquid if the temperature of the mass is below the boiling temperature of acetaldehyde, about 21° C. When it is added as a gas it is preferable, from an economic viewpoint, to reflux the escaping acetaldehyde.

The drying method can be any of the well known drying methods such as spray drying, freeze drying and vacuum drum drying. The selection of the drying method will be influenced by the carbohydrate being used. With certain materials a higher fix is obtained by the spray drying method while with other carbohydrate materials the freeze drying method is more suitable.

The exact mechanism which occurs in the process is not known. It has been postulated that it may be a chemical fixation, as in the formation of a complex, a physical fixation, involving the entrapment of the acetaldehyde within the carbohydrate, or a combination of chemical and physical fixation. In any event when water is added to the dry acetaldehyde-containing food mix the acetaldehyde is quickly released, imparting to the food a freshness reminiscent of freshly picked fruits and vegetables.

The flavor enhancing composition of the present invention can be packaged as is for addition to such foods as fruit beverages or it can be incorporated directly into the beverage mix and the entire mix packaged. The shelf storage life of the acetaldehyde containing flavor enhancing composition can be extended indefinitely if it is stored under conditions of very low humidity. This can be accomplished by packaging it in a hermetically sealed moisture proof container.

The following examples will illustrate specific embodiments of the invention.

EXAMPLE 1

An aqueous solution of lactose was prepared by dissolving 30 grams of lactose in 200 ml. of water. To this solution was added 8 ml. of acetaldehyde while the mixture was stirred vigorously. The mixture was dried in a Niro spray dryer having an inlet temperature of 120° C. and an outlet temperature of 55° C. Upon analysis, it was determined that the flavor enhancing composition contained 7.7% by weight acetaldehyde. After 8 days' storage at 90° F. and 70% relative humidity it was found that the flavor enhancing composition contained 4.7% by weight acetaldehyde, and after 24 days of storage at 90° F. and 70% relative humidity analysis showed that the flavor enhancing composition contained 4.6% by weight acetaldehyde.

EXAMPLE 2

A sample was prepared according to the procedure of Example 1 except that a mixture of 1 part lactose and 3 parts of maltose was substituted for the lactose. After drying the mixture it was determined, upon analysis, that the composition contained 10.4% by weight acetaldehyde. The sample was stored at 90° F. and 70% relative humidity. After 8 days under these conditions analysis showed that the composition contained 5.2% by weight acetaldehyde, and after 24 days the composition contained 4.2% by weight acetaldehyde.

Examples 1 and 2 illustrate that a stable acetaldehyde-containing composition can be prepared by spray-drying a mixture of a sugar and acetaldehyde.

EXAMPLE 3

A sugar melt was prepared by mixing 7 parts by weight sucrose, 3 parts by weight lactose and 2 parts by weight water in a reactor and cooking the mixture to a temperature of about 160° C. The mixture was permitted to cool to a temperature of about 100° C. and then acetaldehyde was bubbled through it. The mixture was permitted to cool, forming a dry amorphous glass. Analysis showed that the composition contained 4.4% by weight acetaldehyde based on the total weight of the mixture. Samples were then stored at 90° F. and 70% relative humidity. After six days' storage under these conditions a sample was analyzed and found to contain 4.2% by weight acetaldehyde. After 15 days' storage under these conditions a sample was analyzed and found to contain 3.4% acetaldehyde. After 26 days storage under these conditions a sample was analyzed and found to contain 3.3% by weight acetaldehyde. This example shows that acetaldehyde can be successfully stored in a dry sugar glass.

EXAMPLE 4

A solution was made of 30 gms. of lactose and 40 ml. of water by heating in a beaker. The solution was cooled to 10° C. and 15 gms. of liquid acetaldehyde at 10° C. was added. The mixture was then placed in a crystallizing dish and cooled to about 2° C. and placed into a vacuum dryer at room temperature, and subjected to a vacuum of 200 microns. The sample was dried for 24 hours and ground to pass through a 30 mesh screen. Analysis showed that the composition contained 16.2% by weight acetaldehyde. This example illustrates that acetaldehyde can be fixed in a sugar by vacuum drying.

EXAMPLE 5

A solution was made of 80 grams of larch gum in 80 ml. of water. About 20 grams of acetaldehyde was slowly added to the solution with vigorous agitation until a homogeneous emulsion was obtained. The emulsified mixture was spray-dried in a drying chamber having an inlet air temperature of 285° F. and an outlet air temperature of 140° F. The dried product contained 10.2 grams of acetaldehyde. This example shows that acetaldehyde can be fixed in a hydrophilic gum by the spray drying method.

EXAMPLE 6

80 gms. of corn syrup solids (24 DE) was dissolved in 80 ml. of water. The solution was then cooled to 25° C. and 20 gms. of cold acetaldehyde (about 10° C.) was added to it. The resulting mixture was homogenized with an Eppenbach stirrer and immediately poured into a tray and frozen in a Dry Ice-acetone bath. The frozen mixture was freeze-dried overnight in a Stokes freeze-dryer. A portion of the product was immediately analyzed and found to contain 11.7% by weight acetaldehyde. The remaining product was packaged in commercial gelatin dessert pouches and stored at 90° F. and 70% relative humidity. One of the samples was examined after 45 days and found to contain 5.4% by weight acetaldehyde. A second sample was examined after 84 days of storage and found to contain 4.5% by weight acetaldehyde, indicating that a considerable amount of the acetaldehyde fixed still remained.

EXAMPLE 7

The procedure of Example 6 was repeated except that sucrose was substituted for the corn syrup solids. The initial analysis indicated that 11.9% by weight acetaldehyde was retained. Subsequent examinations revealed that after 45 days, 4.2% by weight acetaldehyde was present in the sample, and after 84 days, 4.3% by weight acetaldehyde remained fixed. Examples 6 and 7 show that freeze drying procedures can be used to fix acetaldehyde in carbohydrate substances.

EXAMPLE 8

To 80 ml. of water was added 80 gms. of tapioca dextrin and 20 gms. of acetaldehyde and the mixture was homogenized with an Eppenbach homogenizer. The homogenized mixture was then spray dried in the Niro spray dryer, and the composition was stored in commercial gelatin dessert pouches at 90° F. and 70% relative humidity. Analysis of the product during storage is shown in Table I.

TABLE I

| Storage time: | Percent by weight acetaldehyde tapioca dextrins |
|---|---|
| Initial fix | 7.1 |
| 19 days | 6.0 |
| 34 days | 6.0 |
| 56 days | 5.7 |
| 83 days | 4.9 |

EXAMPLE 9

An acetaldehyde-containing composition was prepared according to the procedure of Example 8 except that gum arabic was substituted for tapioca dextrin. The sample was stored at 90° F. and 70% relative humidity. The analysis during the storage period is shown in Table II.

TABLE II

| Storage time: | Percent by weight acetaldehyde gum arabic |
|---|---|
| Initial fix | 7.3 |
| 19 days | 6.5 |
| 34 days | 4.2 |
| 56 days | 4.3 |
| 83 days | 3.4 |

Examples 8 and 9 illustrate that acetaldehyde can be fixed in a hydrophilic colloid and a dextrin by spray drying procedures.

Although the invention is described with particular reference to specific examples it is understood that the invention is not limited thereto, and that the scope of the invention is limited only by the breadth of the appended claims.

What is claimed is:

1. A process for preparing a flavor enhancing composition comprising
    (a) mixing with water, acetaldehyde and a carbohydrate selected from the group consisting of hydrophilic colloids not having free amine groups, water dispersible dextrins, partially hydrolyzed starches, sugars, and mixtures of any of these, and
    (b) drying the aqueous carbohydrate-acetaldehyde mixture thereby fixing the acetaldehyde in the carbohydrate.

2. A process according to claim 1 wherein the carbohydrate is a sugar selected from the group consisting of lactose, sucrose, maltose, and mixtures of any of these.

3. A process according to claim 1 wherein the carbohydrate is corn syrup solids.

4. A process according to claim 1 wherein the dried flavor enhancing composition is hermetically sealed in a moisture-proof container.

5. A process according to claim 1 wherein the dried flavor enhancing composition is blended with a powdered food composition and the resulting mixture is hermetically sealed in a moisture-proof container.

6. A process according to claim 1 wherein the drying method is selected from the group consisting of spray drying, freeze drying and vacuum drying.

7. A process for preparing a dry, powdered flavor enhancing composition comprising
    (a) dissolving lactose in water,
    (b) adding acetaldehyde to the lactose solution, and
    (c) spray-drying the lactose-acetaldehyde solution thereby fixing the acetaldehyde in the lactose.

8. A process for preparing a dry flavor enhancing composition comprising
    (a) dissolving corn syrup solids in water,
    (b) adding acetaldehyde to the corn syrup solids solution,
    (c) freezing the acetaldehyde-corn syrup solids solution, and
    (d) freeze-drying the frozen acetaldehyde-corn syrup solids mixture thereby fixing the acetaldehyde in the corn syrup solids.

9. A process for preparing a flavor enhancing composition comprising
    (a) heating a member selected from the group consisting of lactose, dextrose, sucrose, maltose, corn syrup and mixtures of any of these until it forms a uniform melt,
    (b) uniformly blending acetaldehyde into the melt, and
    (c) rapidly cooling the acetaldehyde-containing melt thereby fixing the acetaldehyde in the melt.

10. A process according to claim 9 wherein the cooled acetaldehyde-containing melt is comminuted.

11. A flavor-enhancing composition comprising acetyldehyde fixed with a carbohydrate selected from the group consisting of hydrophilic colloids not having a free amine group, water-dispersible dextrins, partially hydrolyzed starches, sugars, and mixtures of any of these.

12. The product of claim 11 wherein the carbohydrate is corn syrup solids.

13. A dry powdered food product containing the flavor enhancing composition of claim 11.

14. A storage-stable flavor enhancing composition comprised of acetaldehyde fixed with a sugar selected from the group consisting of lactose, dextrose, sucrose, maltose, and mixtures of any of these.

References Cited

UNITED STATES PATENTS 2,856,291  10/1958  Schultz _____ 99—140
3,264,114  8/1966  Glicksman et al. _____ 99—130

A. LOUIS MONACELL, Primary Examiner

W. BOVEE, Assistant Examiner

U.S. Cl. X.R.

99—78, 130